US012274942B2

(12) United States Patent
Wei et al.

(10) Patent No.: US 12,274,942 B2
(45) Date of Patent: Apr. 15, 2025

(54) VIRTUAL OBJECT CONTROL METHOD AND APPARATUS, COMPUTER DEVICE, AND STORAGE MEDIUM

(71) Applicant: Tencent Technology (Shenzhen) Company Limited, Shenzhen (CN)

(72) Inventors: Jiacheng Wei, Shenzhen (CN); Xun Hu, Shenzhen (CN); Shandong Su, Shenzhen (CN); Kang Zhang, Shenzhen (CN); Yulin Wan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 374 days.

(21) Appl. No.: 17/828,941

(22) Filed: May 31, 2022

(65) Prior Publication Data

US 2022/0362673 A1    Nov. 17, 2022

Related U.S. Application Data

(63) Continuation of application No. PCT/CN2021/125702, filed on Oct. 22, 2021.

(30) Foreign Application Priority Data

May 13, 2021 (CN) .......................... 202110523037.2

(51) Int. Cl.
*A63F 13/56* (2014.01)
*A63F 13/537* (2014.01)

(52) U.S. Cl.
CPC ............ *A63F 13/56* (2014.09); *A63F 13/537* (2014.09)

(58) Field of Classification Search
CPC .......... A63F 13/52; A63F 13/56; A63F 13/57; A63F 13/577; A63F 13/833;
(Continued)

(56) References Cited

U.S. PATENT DOCUMENTS 6,987,512 B2 * 1/2006 Robertson ............... G06T 15/20
345/581
7,774,155 B2 * 8/2010 Sato ....................... A63F 13/428
345/169
(Continued)

FOREIGN PATENT DOCUMENTS

CN    107193479 A    9/2017
CN    110694261 A    1/2020
(Continued)

OTHER PUBLICATIONS

Machine translation of Chinese patent publication CN 110694261 A, downloaded from worldwide.espacenet.com, Feb. 7, 2025.*
(Continued)

*Primary Examiner* — David L Lewis
*Assistant Examiner* — Matthew D Hoel
(74) *Attorney, Agent, or Firm* — Morgan, Lewis & Bockius LLP

(57) ABSTRACT

A virtual object control method includes: controlling a first virtual object to move toward a target position in response to detecting a triggering operation on a first skill; while the first skill is in effect, detecting a triggering operation on a second skill; in response to detecting the triggering operation on the second skill: searching, based on the target position, for a target virtual object; and in accordance with a determination that the first virtual object reaches the target position: controlling the first virtual object to cast the second skill on the target virtual object. Searching is performed based on the target position associated with the first skill, so
(Continued)

that a target actually attacked matches a target the user intends to attack, thereby improving the efficiency of human-machine interaction.

20 Claims, 6 Drawing Sheets

(58) Field of Classification Search
CPC ............ A63F 13/837; A63F 2300/8082; A63F 13/537; A63F 13/5372; A63F 13/822; A63F 13/426; A63F 13/55
See application file for complete search history.

(56) References Cited

U.S. PATENT DOCUMENTS

| | | | | |
|---|---|---|---|---|
| 10,466,775 | B2* | 11/2019 | Inomata | G06T 11/60 |
| 10,765,945 | B2* | 9/2020 | Kitazono | A63F 13/5258 |
| 10,789,816 | B2 | 9/2020 | Pierce et al. | |
| 10,918,947 | B2 | 2/2021 | Wada et al. | |
| 11,094,106 | B2* | 8/2021 | Tamaoki | A63F 13/525 |
| 11,369,875 | B2* | 6/2022 | Nakada | A63F 13/48 |
| 11,446,578 | B2* | 9/2022 | Tanaka | A63F 13/537 |
| 11,497,996 | B2* | 11/2022 | Imai | A63F 13/55 |
| 11,508,125 | B1* | 11/2022 | Latta | G06T 19/003 |
| 11,656,755 | B2* | 5/2023 | Pan | G06F 3/04812 |
| | | | | 715/769 |
| 11,779,839 | B2* | 10/2023 | Imai | A63F 13/428 |
| | | | | 463/37 |
| 2004/0229695 | A1* | 11/2004 | Hussaini | A63F 13/24 |
| | | | | 463/38 |
| 2005/0026695 | A1* | 2/2005 | Tsuchiyama | A63F 13/30 |
| | | | | 463/42 |
| 2005/0166159 | A1* | 7/2005 | Mondry | G06F 3/0486 |
| | | | | 715/769 |
| 2007/0150834 | A1* | 6/2007 | Muller | G06F 3/0486 |
| | | | | 715/810 |
| 2007/0173334 | A1* | 7/2007 | Whitby | A63F 13/98 |
| | | | | 463/47 |
| 2007/0265081 | A1* | 11/2007 | Shimura | A63F 13/426 |
| | | | | 463/37 |
| 2008/0132335 | A1* | 6/2008 | Yamaguchi | A63F 13/573 |
| | | | | 463/37 |
| 2011/0265041 | A1* | 10/2011 | Ganetakos | A63F 13/533 |
| | | | | 715/834 |
| 2012/0062444 | A1* | 3/2012 | Cok | G02B 27/0172 |
| | | | | 345/8 |
| 2012/0184368 | A1 | 7/2012 | Yamaoka | |
| 2013/0095924 | A1* | 4/2013 | Geisner | A63F 13/21 |
| | | | | 463/32 |
| 2013/0290884 | A1* | 10/2013 | Sotoike | A63F 13/42 |
| | | | | 715/765 |
| 2013/0328927 | A1* | 12/2013 | Mount | G06T 19/20 |
| | | | | 345/633 |
| 2013/0336629 | A1* | 12/2013 | Mulholland | H04N 9/87 |
| | | | | 386/230 |
| 2014/0078175 | A1* | 3/2014 | Forutanpour | G06F 3/012 |
| | | | | 345/633 |
| 2014/0364212 | A1* | 12/2014 | Osman | A63F 13/212 |
| | | | | 463/31 |
| 2015/0258432 | A1* | 9/2015 | Stafford | A63F 13/426 |
| | | | | 463/32 |
| 2016/0042566 | A1* | 2/2016 | Mao | A63F 13/211 |
| | | | | 463/31 |
| 2016/0266386 | A1* | 9/2016 | Scott | G06F 3/012 |
| 2016/0361649 | A1* | 12/2016 | Hayashi | A63F 13/5255 |
| 2017/0038838 | A1* | 2/2017 | Kato | G06F 3/0481 |
| 2017/0266556 | A1* | 9/2017 | Motohashi | A63F 13/35 |
| 2017/0340977 | A1* | 11/2017 | Guthridge | A63F 13/795 |
| 2021/0236934 | A1* | 8/2021 | Yagihashi | A63F 13/533 |
| 2022/0016528 | A1* | 1/2022 | Ichikawa | A63F 13/56 |
| 2022/0152501 | A1* | 5/2022 | Liu | A63F 13/58 |
| 2022/0266141 | A1* | 8/2022 | Liu | A63F 13/537 |
| 2022/0266142 | A1* | 8/2022 | Liu | G06F 3/04817 |
| 2022/0266143 | A1* | 8/2022 | Feng | A63F 13/2145 |
| 2022/0355202 | A1* | 11/2022 | Li | A63F 13/533 |
| 2023/0347244 | A1* | 11/2023 | Chen | A63F 13/58 |

FOREIGN PATENT DOCUMENTS

| | | |
|---|---|---|
| CN | 110812838 A | 2/2020 |
| CN | 111589135 A | 8/2020 |
| CN | 111589142 A | 8/2020 |
| CN | 111672102 A | 9/2020 |
| CN | 111672114 A | 9/2020 |
| CN | 111672127 A | 9/2020 |
| CN | 112402949 A | 2/2021 |
| CN | 112494955 A | 3/2021 |
| CN | 113101656 A | 7/2021 |
| JP | 7355948 B2 | 10/2023 |
| KR | 20180012790 A | 2/2018 |

OTHER PUBLICATIONS

Tencent Technology, Korean Office Action, KR Patent Application No. 10-2022-7027859, Jul. 3, 2024, 32 pgs.
Bilibili.com, "[FA King's Required Course] 12_Teach You How to Use Han Xin's Seamless Combo to Sweep Through Thousands of Troops!", Sep. 2016, 2 pgs., Retrieved from the Internet: https://www.bilibili.com/video/BV1Us411t792/?vd_source=5721e8c136869c554f467e59deab722e.
YouTube.com, "Honor of Kings, [Prince Youngyo Capper] Two Hundred Plays", Nov. 2015, 2 pgs., Retrieved from the Internet: https://www.youtube.com/watch?v=52-9RXU1zvE.
Tencent Technology, ISR, PCT/CN2021/125702, Feb. 10, 2022, 2 pgs.
Tencent Technology, WO, PCT/CN2021/125702, Feb. 10, 2022, 4 pgs.
Tencent Technology, IPRP, PCT/CN2021/125702, Nov. 14, 2023, 5 pgs.
Tencent Technology, Japanese Office Action, JP Patent Application No. 2023-154190, Nov. 22, 2024, 13 pgs.
YouTube.com, EJGaming, "Xeniel! Hero Support Bisa Teleport 1 MAP! Super Keren!—Arena of Valor AOV", Nov. 2017, Retrieved from the Internet: https://www.youtube.com/watch?v=5tQZBpbiApQ.

* cited by examiner

VIRTUAL OBJECT CONTROL METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/125702, entitled "CONTROL METHODS, DEVICES, COMPUTER EQUIPMENT AND STORAGE MEDIA FOR VIRTUAL OBJECTS" filed on Oct. 22, 2021, which claims priority to Chinese Patent Application No. 202110523037.2, filed with the State Intellectual Property Office of the People's Republic of China on May 13, 2021, and entitled "VIRTUAL OBJECT CONTROL METHOD AND APPARATUS, TERMINAL, AND STORAGE MEDIUM", all of which are incorporated herein by reference in their entirety.

FIELD OF THE TECHNOLOGY

This application relates to the field of computer technologies, and in particular, to a virtual object control method and apparatus, a computer device, and a storage medium.

BACKGROUND OF THE DISCLOSURE

Multiplayer Online Battle Arena (MOBA) games have gradually become an extremely important type of mobile games. During the game, the user can control a virtual object to cast skills, such as displacement skills, teleportation skills, etc., so that the virtual object moves based on the skills to change the position of the virtual object in a virtual scene.

SUMMARY

Embodiments of this application provide a virtual object control method and apparatus, a computer device, and a storage medium, so that a virtual object actually attacked is consistent with a virtual object expected to be attacked by the user, thereby significantly improving the efficiency of human-machine interaction. The technical solutions are as follows:

According to one aspect, a virtual object control method is provided, the method including:
  controlling a first virtual object to move toward a target position in response to detecting a triggering operation on a first skill used for changing a position of the first virtual object;
  while the first skill is in effect, detecting a triggering operation on a second skill;
  in response to detecting the triggering operation on the second skill:
  searching, based on the target position, for a target virtual object; and
  in accordance with a determination that the first virtual object reaches the target position:
  controlling the first virtual object to cast the second skill on the target virtual object.

According to another aspect, a virtual object control apparatus is provided, the apparatus including:
  a first control module, configured to control a first virtual object to move toward a target position in response to a triggering operation on a first skill, the first skill being used for changing a position of the first virtual object;
  a first display module, configured to search based on the target position to obtain a target virtual object, in response to a triggering operation on the second skill during a period where the first skill takes effect; and
  a second control module, configured to control the first virtual object to cast the second skill to the target virtual object in accordance with a determination that the first virtual object reaches the target position.

In some embodiments, the first display module is configured to mark up the target virtual object found.

In some embodiments, the first display module is configured to determine the target position on a movement path corresponding to the first skill in response to the triggering operation on the first skill; and control the first virtual object to move toward the target position.

In some embodiments, the first display module is configured to correct an end position of the movement path to obtain the target position in accordance with a determination that there is an obstacle in the movement path, in response to the triggering operation on the first skill.

In some embodiments, the first display module is configured to display the movement path in response to the triggering operation on the first skill.

In some embodiments, the first display module is configured to determine the target position in accordance with a determination that an end position corresponding to the first skill is a position unreachable for virtual objects, in response to the triggering operation on the first skill, the target position being a position reachable for virtual objects; and control the first virtual object to move toward the target position.

In some embodiments, the first display module is configured to correct the end position to obtain the target position in accordance with a determination that the end position is a position unreachable for virtual objects.

In some embodiments, the first display module is configured to display the end position in response to the triggering operation on the first skill.

In some embodiments, the first display module is configured to determine a skill search range corresponding to the second skill by using the target position as a search center, in response to the triggering operation on the second skill during the period where the first skill takes effect; and search within the skill search range to obtain the target virtual object.

In some embodiments, the first display module is configured to display the skill search range.

In some embodiments, the apparatus further includes:
  a second display module, configured to display a skill indication mark of the second skill in response to the triggering operation on the second skill during the period where the first skill takes effect, the skill indication mark pointing from the target position to a position of the target virtual object.

In some embodiments, the second display module is configured to generate a substitute object corresponding to the first virtual object at the target position, the substitute object being an invisible object; determine an orientation of the substitute object based on the position of the target virtual object; and display the skill indication mark of the second skill based on the orientation of the substitute object.

In some embodiments, the apparatus further includes:
  a determining module, configured to update the target position to a current position of the first virtual object in accordance with a determination that a movement process of the first virtual object is interrupted.

In some embodiments, the apparatus further includes:

an updating module, configured to update the target position in real time according to a position of the second virtual object, in accordance with a determination that the first skill is used for moving the first virtual object to the position of the second virtual object.

According to another aspect, a computer device is provided, including a processor and a memory, the memory storing at least one computer program, and the at least one computer program being loaded and executed by the processor to implement the operations executed in the virtual object control method in the embodiments of the present application.

According to another aspect, a computer-readable storage medium is provided, storing at least one computer program, the at least one computer program being loaded and executed by a processor to implement the operations executed in the virtual object control method in the embodiments of the present application.

According to another aspect, a computer program product is provided, including a computer program code, the computer program code being stored in a computer-readable storage medium. A processor of a computer device reads the computer program code from the computer-readable storage medium, and executes the computer program code, so that the computer device executes the virtual object control method provided in the some embodiments of the aspects described above.

The technical solutions provided in the embodiments of this application bring about the following beneficial effects:

In the solution provided by the embodiments of this application, by searching based on the target indicated by the first skill in response to the triggering operation on the second skill during a period where the first skill takes effect, the target virtual object can be found; then, when the first virtual object stops moving and reaches the target position, the first virtual object is controlled to cast the second skill to the target virtual object, so that a virtual object actually attacked is consistent with a virtual object expected to be attacked by the user, thereby significantly improving the efficiency of human-machine interaction.

BRIEF DESCRIPTION OF THE DRAWINGS

To describe technical solutions in embodiments of this application more clearly, the following briefly introduces accompanying drawings required for describing the embodiments. Apparently, the accompanying drawings in the following description show merely some embodiments of this application, and a person of ordinary skill in the art may still derive other accompanying drawings according to the accompanying drawings without creative efforts.

DESCRIPTION OF EMBODIMENTS

Figure 1:
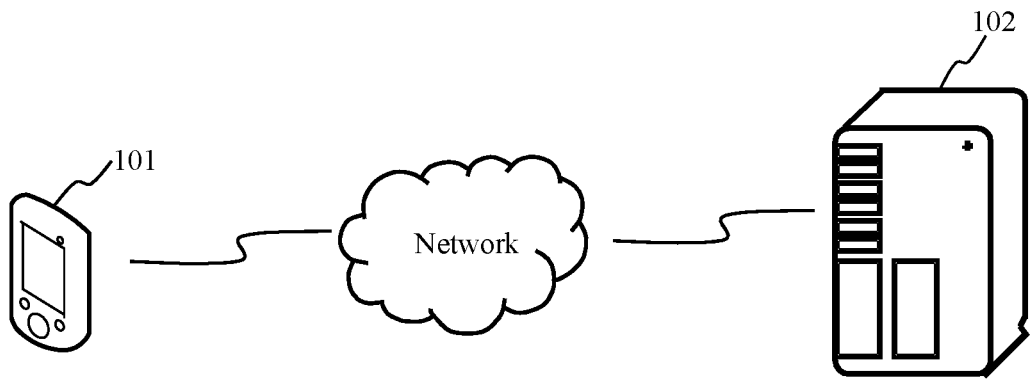
FIG. 1 is a schematic diagram of an implementation environment of a virtual object control method according to an embodiment of this application.

To make objectives, technical solutions, and advantages of this application clearer, the following further describes implementations of this application in detail with reference to the accompanying drawings.

Terms such as "first" and "second" in this application are used for distinguishing between same items or similar items that have basically same functions and purposes. It is to be understood that "first", "second", and "nth" do not have any dependency relationship in logic or in a time sequence, and do not limit a quantity or an execution sequence.

In this application, the term "at least one" refers to one or more, the term "plurality of" or "multiple" refers to two or more. For example, a plurality of virtual objects refer to two or more virtual objects.

For convenience of understanding of the technical process of the embodiments of this application, some terms related in the embodiments of this application are described below:

Virtual scene: a virtual scene displayed (or provided) when an application program is run on a terminal. In some embodiments, the virtual scene is a simulated environment of a real world, or a semi-simulated semi-fictional virtual environment, or an entirely fictional virtual environment. In some embodiments, the virtual scene is any one of a two-dimensional virtual scene, a 2.5-dimensional virtual scene, or a three-dimensional virtual scene. The number of dimensions of the virtual scene is not limited in the embodiments of this application. For example, the virtual scene includes sky, land, ocean, or the like. The land includes environmental elements such as a desert and a city. The user can control a virtual object to move in the virtual scene. In some embodiments, the virtual scene is used for a virtual scene battle between at least two virtual objects, and there are virtual resources available to the at least two virtual objects in the virtual scene. In some embodiments, the virtual scene includes two symmetric regions, virtual objects on two opposing camps occupy the regions respectively, and a goal of each side is to destroy a target building/fort/base/crystal deep in the opponent's region to win victory. For example, the symmetric regions are a lower left corner region and an upper right corner region, or a middle left region and a middle right region.

Virtual object: a movable object in a virtual scene. In some embodiments, the movable object is a virtual character, a virtual animal, a cartoon character, or the like, for example, a character, an animal, a plant, an oil drum, a wall, or a stone displayed in a virtual scene. The virtual object is a virtual image used for representing a user in the virtual scene. In some embodiments, the virtual scene includes a plurality of virtual objects, and each virtual object has a shape and a volume in the virtual scene, and occupies some space in the virtual scene. In some embodiments, when the virtual scene is a three-dimensional virtual scene, in some embodiments, the virtual object is a three-dimensional model, the three-dimensional model is a three-dimensional character constructed based on a three-dimensional human skeleton technology, and the same virtual object shows different appearances by wearing different skins. In some embodiments, the virtual object may be alternatively implemented by using a 2.5-dimensional model or a two-dimensional model, which is not limited in the embodiments of this application.

In some embodiments, the virtual object is a player character controlled through an operation on a client, or an artificial intelligence (AI) character set in a virtual scene battle through training, or a non-player character (NPC) set in a virtual scene interaction. In some embodiments, the virtual object is a virtual character for competition in a virtual scene. In some embodiments, a quantity of virtual objects participating in the interaction in the virtual scene is preset, or is dynamically determined according to a quantity of clients participating in the interaction.

NPC object: An NPC object refer to a virtual object that is not controlled by a user, and may include other forms sch as a virtual creature, a virtual article, and a virtual ghost. An NPC object may belong to a user camp engaging in a confrontation, or may not belong to any user camp engaging in the confrontation (that is, may be a neutral virtual object).

Neutral virtual object: An NPC objects that does not belong to any user camp engaging in a confrontation may be commonly referred to as a "neutral virtual object". The neutral virtual object can confront against a virtual object of any user camp engaging in the confrontation. In other words, the neutral virtual object can attack a virtual object of any user camp engaging in the confrontation, and can also be attacked by a virtual object of any user camp engaging in the confrontation. For example, the neutral virtual object includes a first virtual object and a second virtual object involved in the embodiments of this application. The neutral virtual object is usually used as a competitive resource that can be captured, and provide a buff for the capturing party. For example, the neutral virtual object is contested by user camps engaging in the confrontation in a confrontational manner, and the user who is the first to defeat (or kill) the neutral virtual object can obtain the buff provided by the neutral virtual object.

A Multiplayer Online Battle Arena (MOBA) game is a game in which several forts are provided in a virtual scene, and users on different camps control virtual objects to battle in the virtual scene, occupy forts or destroy forts of the opposing camp. For example, a MOBA game may divide users into at least two opposing camps, and different virtual teams on the at least two opposing camps occupy respective map regions, and compete against each other using specific victory conditions as goals. The victory conditions include, but are not limited to at least one of occupying forts or destroy forts of the opposing camps, killing virtual objects in the opposing camps, surviving in a specified scenario and time, seizing a specific resource, or outscoring the opponent within a specified time. For example, in a mobile MOBA game, users may be divided into two opposing camps. Virtual objects controlled by the users are scattered in the virtual scene to compete against each other, and the victory condition is to destroy or occupy all enemy forts.

In some embodiments, each virtual team includes one or more virtual objects, such as 1, 2, 3, or 5. According to a quantity of virtual objects in each team participating in the battle arena, the battle arena may be divided into 1V1 competition, 2V2 competition, 3V3 competition, 5V5 competition, and the like. 1V1 means "1 vs. 1", which will not be described in detail herein.

In some embodiments, the MOBA game may take place in rounds (or turns), and each round of the battle arena may have the same map or different maps. A duration of one round of the MOBA game is from a moment at which the game starts to a moment at which the victory condition is met.

In the MOBA games, users can further control the virtual objects to cast skills to fight with other virtual objects. For example, the skill types of the skills include an attack skill, a defense skill, a healing skill, an auxiliary skill, a beheading skill, and the like. Each virtual object may have one or more fixed skills, and different virtual objects generally have different skills. Different skills can produce different effects. For example, if a virtual object casts a displacement skill, the virtual object will move a certain distance in the virtual scene. In another example, if a virtual object casts a teleportation skill, the virtual object will travel from one position to another position in the virtual scene. All other types of skills can produce corresponding effects, which will not be enumerated here.

The following describes an implementation environment involved in this application.

FIG. 1 is a schematic diagram of an implementation environment of a virtual object control method according to an embodiment of this application. Referring to FIG. 1, the implementation environment includes a terminal 101 and a server 102.

The terminal 101 and the server 102 may be directly or indirectly connected in a wired or wireless communication manner, which is not limited in this application.

In some embodiments, the terminal 101 may be a smartphone, a tablet computer, a notebook computer, a desktop computer, a smart speaker, a smartwatch, or the like, but is not limited thereto. An application program used for displaying a virtual scene is installed and run on the terminal 101. The APP is used for starting any one of a first-person shooting (FPS) game, a third-person shooting game, multi-player online battle arena (MOBA) games, a virtual reality APP, a three-dimensional map program, a military simulation program, and a multiplayer gunfight survival game. Illustratively, the terminal 101 is a terminal used by a user, and a user account of the user is logged in the APP installed and run by the terminal 101. The user uses the terminal 101 to operate a virtual object located in a virtual scene through the APP to perform a movement. The movement includes, but is not limited to, at least one of body posture adjustment, crawling, walking, running, cycling, jumping, driving, picking-up, shooting, attacking, and throwing. For example, the virtual object is a virtual character such as a simulated character role or a cartoon character role.

In some embodiments, the server 102 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

In some embodiments, a virtual object controlled by the terminal 101 (hereinafter referred to as a controlled virtual object) and a virtual object controlled by another terminal (hereinafter referred to as another virtual object) are in the same virtual scene, and in this case, the controlled virtual object can interact with the another virtual object in the virtual scene. In some embodiments, the controlled virtual object and the another virtual object are in an adversarial relationship. For example, the controlled virtual object and the another virtual object belong to different teams and organizations. The virtual objects in the adversarial relationship can conduct confrontational interactions by casting skills to each other.

Figure 2:
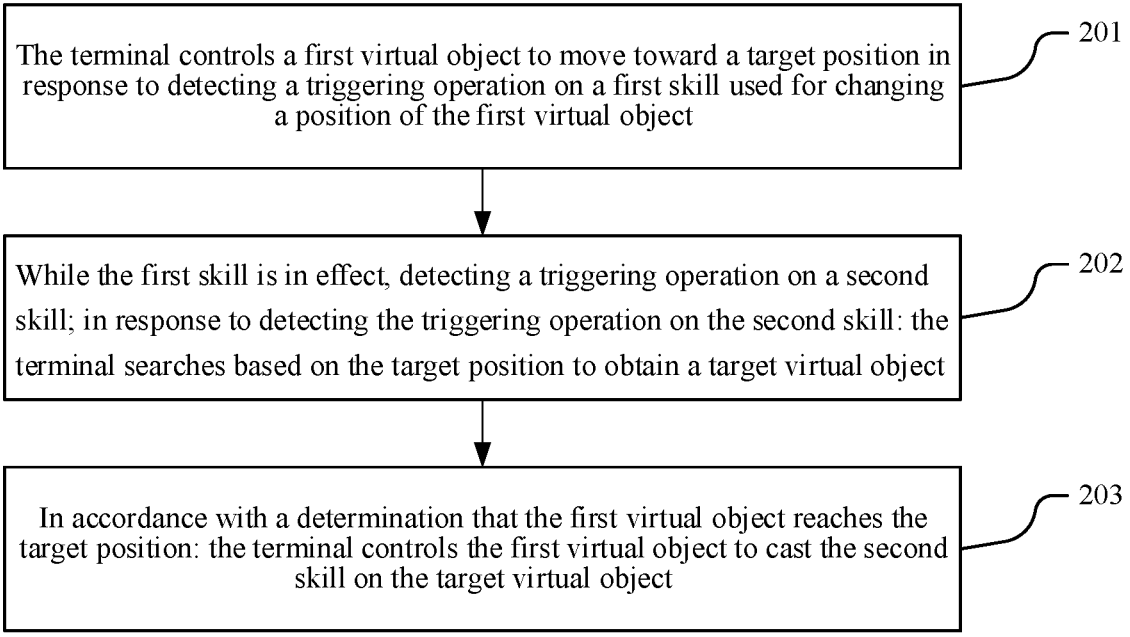
FIG. 2 is a flowchart of a virtual object control method according to an embodiment of this application.

FIG. 2 is a flowchart of a virtual object control method according to an embodiment of this application. As shown in FIG. 2, in this embodiment of the present application, the virtual object control method is executed by a terminal, for example. The virtual object control method includes the following steps:

201. The terminal controls a first virtual object to move toward a target position in response to a triggering operation on a first skill, the first skill being used for changing a position of the first virtual object.

The target position is a position corresponding to the first skill, and the first skill is used for changing the position of the first virtual object in a virtual scene. In an embodiment of this application, the first virtual object is displayed in the virtual scene, and the first virtual object is a virtual object controlled by a user account currently logged in to by the terminal. The first virtual object corresponds to two or more skills. The first skill is used for changing the position of the first virtual object in the virtual scene. The target position is a position to which the first virtual object moves based on the first skill. In some embodiments, the first skill is a displacement skill, or the first skill is a teleportation skill. In some embodiments, the virtual scene includes two symmetric regions. Virtual objects on two opposing camps occupy the regions respectively, and a goal of each side is to destroy a target building/stronghold/base/crystal deep in the opponent's region to win victory. The symmetric regions are, for example, a lower left corner region and an upper right corner region, and in another example, a left middle region and a right middle region.

For example, assuming that the first skill is the displacement skill, the terminal controls the first virtual object to sprint forward for a certain distance based on the first skill to reach the target position, in response to a triggering operation on the first skill. In other words, the terminal displays a continuous movement of the first virtual object from a current position to the target position.

In another example, assuming the first skill is the teleportation skill, the terminal controls the first virtual object to remain stationary, displays a teleportation special effect, cancels the displaying of the first virtual object at the current position, and displays the first virtual object at the target location, in response to the triggering operation on the first skill.

202. The terminal searches based on the target position to obtain a target virtual object, in response to a triggering operation on the second skill during a period where the first skill takes effect.

The second skill is used for interacting with a virtual object. For example, the second skill is used for attacking, curing, or defending against a virtual object. In the embodiments of this application, the period where the first skill takes effect refers to a duration from a moment when the terminal controls the first virtual object to start moving based on the first skill to a moment when the first virtual object stops moving based on the first skill. If the terminal detects the triggering operation on the second skill during the period where the first skill takes effect, the terminal searches based on the target position, uses a virtual object found as the target virtual object, and displays the target virtual object. That is, the terminal searches based on the target position to obtain the target virtual object. In some embodiments, when displaying the target virtual object, the terminal marks the target virtual object as a selected state, so that the user can know which virtual object is the currently selected virtual object. The selected state may be a highlighted virtual object, a triangular mark displayed on the top of the virtual object's head, or a halo displayed at the bottom of the virtual object's feet, etc., which is not limited in the embodiments of this application. That is, the terminal marks up the target virtual object found. The terminal displays the target virtual object before finding the target virtual object, and marks up the target virtual object upon finding the target virtual object, to remind the user that the target virtual object has been found. For example, the markup is highlighting the virtual object, displaying a triangular mark on the top of the virtual object's head, or displaying a halo at the bottom of the virtual object's feet.

203. The terminal controls the first virtual object to cast the second skill to the target virtual object in accordance with a determination that the first virtual object reaches the target position.

In an embodiment of this application, if the first virtual object reaches the target position, indicating that the execution of the first skill ends, the terminal controls the first virtual object to cast the second skill at the target position, where a target of the second skill is the above-mentioned target virtual object.

At present, in a mobile MOBA game, if the user triggers an attack skill during movement of the first virtual object based on a skill, the terminal searches according to the position of the first virtual object when the attack skill is triggered, uses a second virtual object found as a target of the attack skill, and after the movement of the first virtual object ends, controls the first virtual object to cast the attack skill to the second virtual object found. However, an object that the user intends to attack may not be the second virtual object, but is a virtual object near the first virtual object when the movement of the first virtual object ends. Consequently, the virtual object actually attacked is not the object that the user intends to attack, resulting in low efficiency of human-machine interaction.

In the solution provided by the embodiments of this application, by searching based on the target indicated by the first skill in response to the triggering operation on the second skill during a period where the first skill takes effect, the target virtual object can be found; then, when the first virtual object stops moving and reaches the target position, the first virtual object is controlled to cast the second skill to the target virtual object, so that a virtual object actually attacked is consistent with a virtual object expected to be attacked by the user, thereby significantly improving the efficiency of human-machine interaction.

Figure 3:
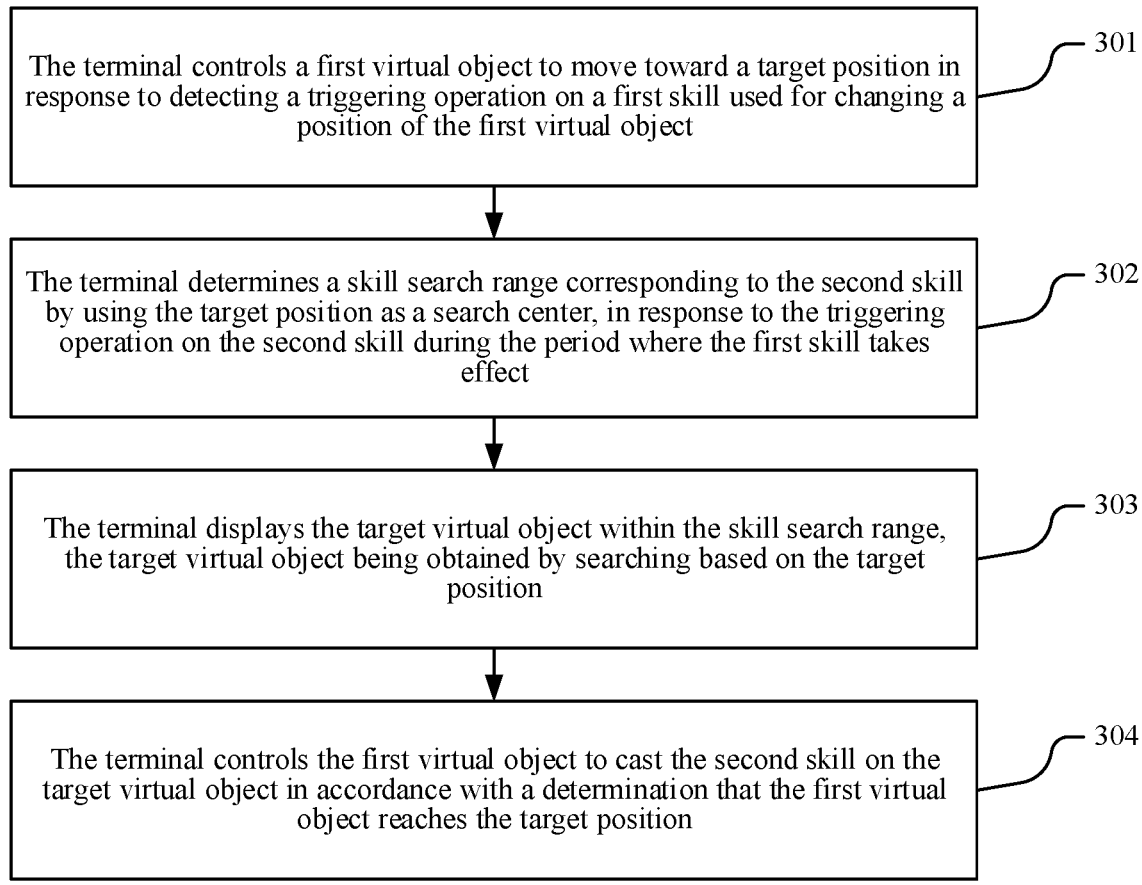
FIG. 3 is a flowchart of another virtual object control method according to an embodiment of this application.

FIG. 3 is a flowchart of another virtual object control method according to an embodiment of this application. As shown in FIG. 3, in this embodiment of the present application, the virtual object control method is executed by a terminal, for example. The virtual object control method includes the following steps:

301. The terminal controls a first virtual object to move toward a target position in response to a triggering operation on a first skill, the first skill being used for changing a position of the first virtual object.

The target position is a position corresponding to the first skill, and the first skill is used for changing the position of the first virtual object in a virtual scene. In an embodiment of this application, the terminal displays the virtual scene, the first virtual object is displayed in the virtual scene, and the first virtual object is a virtual object controlled by a user account logged in to by the terminal. The first virtual object corresponds to two or more skills. The first skill is used for changing a position of a virtual object in the virtual scene. The target position is a position to which the first virtual object moves based on the first skill. In some embodiments, the first skill is used for continuously changing the position of the virtual object in the virtual scene, e.g., is a displacement skill. In this case, the terminal displays a continuous movement of the first virtual object in the virtual scene based on the first skill. In some embodiments, the first skill is used for changing the position of the virtual object in the virtual scene at a time, e.g., is a teleportation skill, a flash skill, etc. In this case, the terminal displays that the first virtual object disappears from the first position based on the first skill, and then appears at the second position, where the first position is the position of the first virtual object before the first skill takes effect, and the second position is the position of the first virtual object after the first skill takes effect.

In some embodiments, when moving based on the first skill, the first virtual object may encounter an impassable obstacle. In this case, the terminal corrects an end position of the first skill to determine the target position. Correspondingly, the terminal displays a movement path corresponding to the first skill in response to the triggering operation on the first skill. The terminal corrects an end position of the movement path to obtain the target position in response to that there is an impassable obstacle in the movement path. By correcting the end position of the movement path in accordance with a determination that there is an impassable obstacle, the inconsistency between the determined target position and the actual position of the first virtual object can be avoided.

For example, the first skill is a displacement skill, but the displacement skill cannot pass through a wall in the virtual scene. After the user triggers the first skill, the terminal displays the movement path of the first skill, so that the user can learn, from the movement path, how the first skill moves the first virtual object. If there is a wall in the movement path, the terminal corrects the end point of the movement path to a side of the wall close to the first virtual object, that is, the first virtual object will move to a position on the side of the wall based on the first skill, instead of moving into the wall or passing through the wall and moving to the other side of the wall.

In other words, the terminal determines the target position on a movement path corresponding to the first skill in response to the triggering operation on the first skill; and controls the first virtual object to move toward the target position. The movement path corresponding to the first skill is determined according to the triggering operation on the first skill. For example, the terminal displays a triggering option corresponding to the first skill, and the triggering operation on the first skill is a dragging operation on the triggering option. In this case, the terminal determines the movement path corresponding to the first skill according to a dragging range of the dragging operation. In another example, the terminal determines an end position corresponding to the first skill according to the triggering operation on the first skill, and determines a straight line between the current position of the first virtual object and the end position as the movement path corresponding to the first skill.

In some embodiments, the electronic device corrects an end position of the movement path to obtain the target position in accordance with a determination that there is an obstacle in the movement path, in response to the triggering operation on the first skill. The terminal corrects the end position of the movement path to obtain a corrected end position, so that there is no obstacle between the corrected end position and the current position of the first virtual object. The terminal determines the end position as the target position. For example, if the movement path intersects with the obstacle, the terminal determines a position of an intersection closest to the first virtual object among intersections of the movement path and the obstacle as the corrected end position, i.e., as the target position.

In some embodiments, the electronic device determines the end position of the movement path as the target position in accordance with a determination that there is no obstacle in the movement path, in response to the triggering operation on the first skill.

Obstacles may be divided into obstacles passable for virtual objects and an obstacle impassable for virtual objects. If there is an obstacle impassable for virtual objects in the movement path, the terminal corrects the end position of the movement path to obtain a target position, so that there is no obstacle impassable for virtual objects between the current position of the first virtual object and the target position. The terminal determines the end position of the movement path as the target position in accordance with a determination that there is an obstacle passable for virtual objects in the movement path or there is no obstacle in the movement path.

In some embodiments, the terminal displays the movement path in response to the triggering operation on the first skill. Correcting the end position of the movement path in accordance with a determination that there is an obstacle in the movement path is equivalent to correcting the movement path, and an end position of the corrected movement path is the corrected end position. In this case, the electronic device switches from displaying the currently displayed movement path to displaying the corrected movement path.

In some embodiments, the terminal displays a movement path corresponding to the first skill in response to a first triggering operation on the first skill, e.g., a press operation; the terminal updates a display position of the movement path according to a second operation on the first skill, e.g., a dragging operation; the terminal corrects an end position of the movement path to obtain a target position and displays a shortened movement path, in response to that there is an impassable obstacle in the movement path. Finally, the terminal controls the first virtual object to move toward the target position along the shortened movement path. For example, there are no impassable obstacle in the shortened movement path.

In some embodiments, when moving based on the first skill, a position to be moved to may be a position unreachable for virtual objects, e.g., a position in a wall. In this case, the terminal corrects an end position of the first skill to determine the target position. Correspondingly, the terminal displays an end position corresponding to the first skill in response to the triggering operation on the first skill. The terminal corrects the end position to obtain the target position in response to that the end position is a position unreachable for virtual objects. By correcting the end position unreachable for virtual objects, the inconsistency between the determined target position and the actual position of the first virtual object can be avoided.

For example, the first skill is the teleportation skill, but the virtual object cannot be teleported into a wall, that is, a position in a wall is a position unreachable for virtual objects. After the user triggers the first skill, the terminal displays the end position of the first skill, and the user can change the end position through a dragging operation. If the final end position is in a wall, the terminal corrects the end position, and uses a position of an edge of the wall closest to the end position as the target position.

That is, the terminal determines a target position and controls the first virtual object to move toward the target position in accordance with a determination that an end position corresponding to the first skill is a position unreachable for virtual objects, in response to the triggering operation on the first skill. The target position is a position reachable for virtual objects.

In some embodiments, the terminal corrects the end position to obtain the target position in accordance with a determination that the end position is a position unreachable for virtual objects. The terminal corrects the end position, so that the corrected end position is a position reachable for virtual objects. Then the terminal determines the corrected end position as the target position.

In some embodiments, the terminal determines an end position corresponding to the first skill as the target position in accordance with a determination that the end position is a position reachable for virtual objects, in response to the triggering operation on the first skill. Because the first virtual object can reach the end position corresponding to the first skill, there is no need to correct the end position, and the end position may be directly determined as the target position.

In some embodiments, the terminal displays the end position in response to the triggering operation on the first skill. After the terminal corrects the end position to obtain a corrected end position in accordance with a determination that the end position is a position unreachable for virtual objects, the terminal switches from displaying the currently displayed end position to displaying the corrected end position.

In some embodiments, the terminal updates the target position in real time according to a position of the second virtual object, in accordance with a determination that the first skill is used for moving the first virtual object to the position of the second virtual object. By updating the target position in real time, the user can choose an appropriate time to cast the second skill according to the position of the second virtual object, thereby achieving a good interaction effect and improving the efficiency of human-machine interaction. In some embodiments, because the first skill is used for moving the first virtual object to the position of the second virtual object, and the first virtual object needs to be moved to the target position in this embodiment of this application, the terminal determines the position of the second virtual object as the target position. In this case, during the movement of the second virtual object, the position of the second virtual object is updated in real time, and correspondingly, the target position is also updated in real time.

For example, the second virtual object is a teammate of the first virtual object, and the second skill is an attack skill having a range centered on the first virtual object. At a certain moment, the second virtual object is fighting with enemies, and the first virtual object is teleported to a position near the second virtual object by a teleportation skill. In this case, during the teleportation process, the user can communicate with the teammate and instruct the teammate to control the second virtual object to move to a position where there are a large number of enemies; then the user triggers the second skill, so that the first virtual object directly casts the second skill after being teleported.

302. The terminal determines a skill search range corresponding to the second skill by using the target position as a search center, in response to the triggering operation on the second skill during the period where the first skill takes effect.

The second skill is used for interacting with a virtual object. In an embodiment of this application, if the terminal detects the triggering operation on the second skill during the period where the first skill takes effect, the terminal searches for virtual objects to which the second skill can be cast. During searching, the terminal determines a skill search range corresponding to the second skill by using the target position as a search center. After determining the skill search range, the terminal displays the skill search range. In some embodiments, the skill search range is a circular area with a radius of N. In some embodiments, the skill search range is a circular area with the target position as the center.

Figure 4:
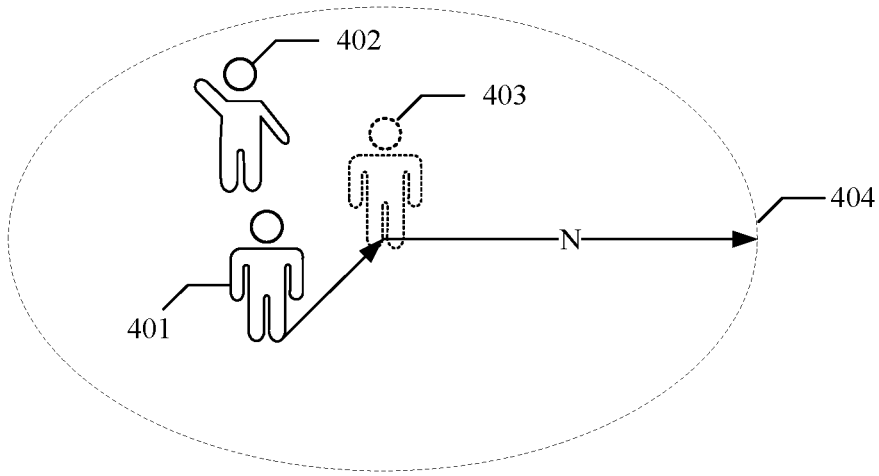
FIG. 4 is a schematic diagram of a skill search range according to an embodiment of this application.

FIG. 4 is a schematic diagram of a skill search range according to an embodiment of this application. As shown in FIG. 4, the skill search range includes a first virtual object 401 and another virtual object 402, and a dotted-line person 403 represents the first virtual object after reaching the target position. A dashed-line area 404 is a circular area with the target position as the center and a radius of N. The dashed-line area 404 is the skill search range corresponding to the second skill.

In some embodiments, the second skill is a skill that needs to be cast after aiming. Correspondingly, the terminal displays a skill indication mark of the second skill in response to the triggering operation on the second skill during the period where the first skill takes effect, the skill indication mark pointing from the target position to a position of the target virtual object. In some embodiments, the skill indication mark is further used for indicating a skill influence range of the second skill, and the target virtual object is in the skill influence range. By displaying the skill indication mark of the second skill, the user can determine a direction in which the second skill is to be cast based on the skill indication mark, thereby ensuring that the second skill can affect the target virtual object.

In some embodiments, the user may also use the terminal to control a substitute object corresponding to the first virtual object during the period where the first skill takes effect. Correspondingly, the terminal generates a substitute object corresponding to the first virtual object at the target position, the substitute object being an invisible object. In some embodiments, the substitute object has two attributes, position and orientation, and has no object model, no animation, and no special effect, etc. The position of the substitute object is the target position. The terminal generates a substitute object corresponding to the first virtual object at the target position; the terminal determines an orientation of the substitute object based on the target position and the position of the target virtual object; the terminal displays the skill indication mark of the second skill based on the orientation of the substitute object. By setting the substitute object, it is not necessary to change the display logic of the skill indication mark, and it is only necessary to temporarily change the virtual object to which the skill is to be cast from the first virtual object to the substitute object.

That is, the terminal generates a substitute object corresponding to the first virtual object at the target position, determines an orientation of the substitute object based on the position of the target virtual object, and displays the skill indication mark of the second skill based on the orientation of the substitute object. The terminal determines a direction from the position of the substitute object to the position of the target virtual object as the orientation of the substitute object, determines the orientation of the substitute object as a direction to which the skill indication mark of the second skill points, so that the skill indication mark points from the target position to the position of the target virtual object.

In some embodiments, the first skill may be interrupted, that is, the movement of the first virtual object based on the first skill may be interrupted, resulting in that the first virtual object not being able to move to the end position corresponding to the first skill based on the first skill. Correspondingly, in accordance with a determination that the movement of the first virtual object is interrupted, the terminal determines the current position of the first virtual object as the target position. That is, the terminal updates the target position to the current position of the first virtual object.

Because the movement of the first virtual object is interrupted, the first virtual object cannot move to the original target position. If the terminal still searches for a target virtual object according to the original target position, a target virtual object found does not meet the expectation of the user, or a target virtual object found based on the original target position is not within an influence range of the second skill. Therefore, after the movement of the first virtual object is interrupted, the target position is re-determined according to the current position of the first virtual object, so that the terminal can search for a target virtual object based on the updated target position, so as to improve the accuracy of virtual object searching, and prevent the user from performing invalid operations, thereby improving the efficiency of human-machine interaction.

In some embodiments, in accordance with a determination that the terminal detects the triggering operation on the second skill during the period where the first skill takes effect and the movement of the first virtual object is interrupted, the terminal cancels the execution of the second skill and sets the second skill to an untriggered state. By setting the second skill to the untriggered state when the first skill is interrupted, the second skill is not executed when the first virtual object cannot reach the target position as expected by the user, thereby avoiding the case that the casting of the second skill cannot meet the user's expectation.

In some embodiments, the terminal determines and displays a skill influence range of the second skill according to the target position and a distance by which the user drags a triggering option corresponding to the second skill. Correspondingly, the terminal obtains a first screen position and a second screen position when the triggering option corresponding to the second skill is dragged, where the first screen position is a starting position, and the second screen position is an ending position. The terminal determines first position information according to the first screen position, the second screen position and a third screen position corresponding to a screen center, where the first position information indicates a direction of a center position of the skill influence range relative to the target position. Then the terminal determines second position information according to the first screen position, the second screen position, dragging range information of the triggering option corresponding to the second skill, and the skill range information of the second skill, where the second position information indicates a distance between the center position of the skill influence range and the target position. Finally, the terminal determines the center position of the skill influence range corresponding to the second skill in the virtual scene according to the target position, the first position information, and the second position information. The terminal determines the skill influence range corresponding to the second skill according to the center position and the skill range information of the second skill. The skill range information includes a skill firing range parameter and a skill influence range parameter. Because a change from the first screen position to the second screen position is mapped as a change from the target position in the virtual scene to the center position of the skill influence range, the center position of the skill influence range is the position expected by the user of the terminal, thereby improving the efficiency of human-machine interaction.

The terminal may express a proportional relationship between distances between positions through the following formula (1):

$$\frac{|DragPos - DownPos|}{MaxDragRadius} = \frac{|FocusPoint - HeroPos|}{SkillRange} \quad (1)$$

where DownPos represents the first screen position, DragPos represents the second screen position, MaxDragRadius represents a maximum dragging range of the triggering option, FocusPoint represents the center position of the skill influence range, HeroPos represents the target position, and SkillRange represents a skill firing range of the second skill.

Based on the above proportional relationship, the terminal maps the third screen position corresponding to the screen center (0,0) into the virtual scene by using a center mapping method, to obtain the first scene position. Then, the terminal determines a distance difference between coordinates of the first screen position and coordinates of the second screen position, and maps a sum of coordinates of the screen center and the distance difference into the virtual scene to obtain the second scene position. A direction from the first scene position to the second scene position is the same as a direction from the target scene position to the center position of the skill influence range. Therefore, the center position of the skill influence range may be calculated by the following formula (2):

$$FocusPoint = HeroPos + \frac{|DragPos - DownPos|}{MaxDragRadius} \times SkillRange \times \quad (2)$$
$$Normalize(ScreenDrag2ScenePos - ScreenCenter2SencePos)$$

where, FocusPoint represents the center position of the skill influence range, HeroPos represents the target position, SkillRange represents the skill firing range of the second skill, Normalize( ) represents normalization, ScreenCenter2SencePos represents the first scene position, and ScreenDrag2ScenePos represents the second scene position.

Figure 5:
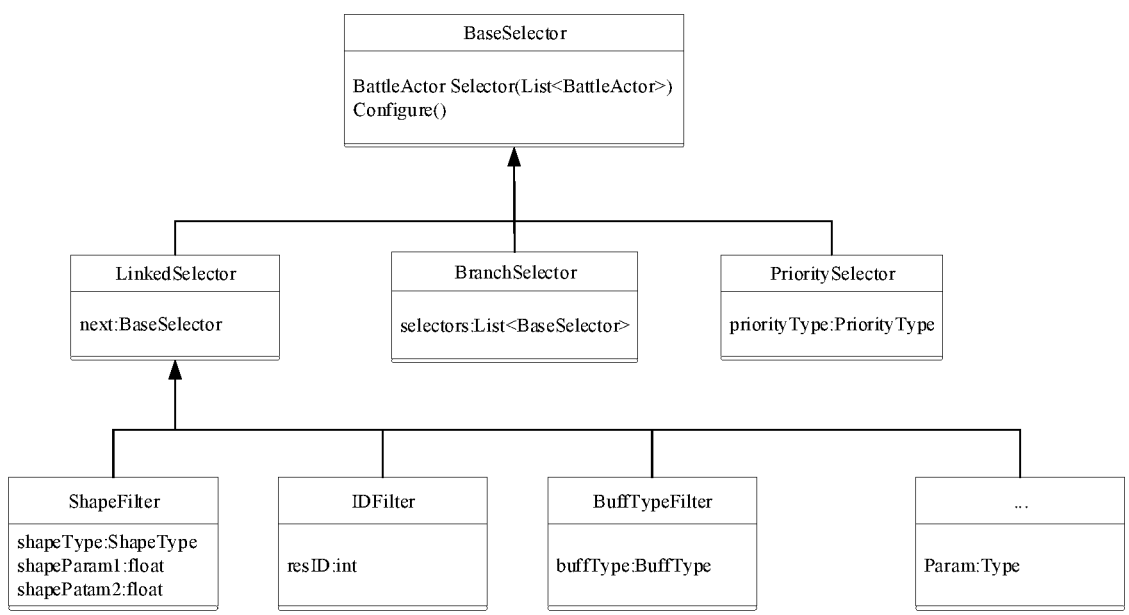
FIG. 5 is a structural class diagram of a search tree according to an embodiment of this application.

In some embodiments, the terminal searches for the target virtual object based on the target position by using a search tree. FIG. 5 is a structural class diagram of a search tree according to an embodiment of this application. As shown in FIG. 5, all nodes in the search tree inherit from a BaseSelector class. BaseSelector has three core derived subclasses, LinkedSelector, BranchSelector, and PrioritySelector. BaseSelector mainly includes two methods: Configure( ) and Select( ). Configure( ) is used for initializing data of each selector by using table data configured by technical personnel. If BranchSelector needs to configure multiple branches, then data configured by Configure( ) is IDs of the multiple branch selectors. In another example, ShapeFilter, a subclass of LinkedSelector, needs to configure a shape field, for example, circle, fan-shaped, circle radius, fan angle, and other parameters. An input parameter of the Select( ) function is List<BattleActor>, which is a list of virtual objects stored, and a return parameter of the Select( ) function is BattleActor, which is a virtual object.

The three core derived classes of BaseSelector are described below.

LinkSelector: The core is to have a next parameter, which is used for representing a next filter, thus forming a chain structure. It has many subclasses, many of which are basically filters, mainly for deleting unqualified BattleActors from the parameter in the Select function, and passing the List<BattleActor> without the unqualified BattleActors to a next selector, thereby realizing the screening of virtual objects. For example, ShapeFilter configures required graphics and parameters in Configure. The Select function determines one by one whether the virtual objects in the parameter List<BattleActor> are within a shape range, and deletes the virtual objects that are not within the shape range from the list. The same applies to other filters. For example, BuffTypeFilter deletes virtual objects that contain a certain type of additional state, e.g., an invisible state, a non-selectable state, etc. IDFilter deletes virtual objects containing an ID of a certain skill, so that the certain skill cannot hit an enemy for the second time. In addition to the above filters, there are many other filters, which will not be described in detail here. The shape range refers to a shape that meets a specific requirement, and a virtual object being not in the shape range refers to a virtual object whose shape does not meet the requirement corresponding to the shape range. Because different types of virtual objects correspond to different shapes, screening the virtual objects based on the shape range can realize the screening of virtual objects of a specific type.

BranchSelector: Its main function is to process multiple condition priorities. IDs of several selectors are configured in a configuration table. In the Configure function, member variables "selectors" are initialized according to the configured selector IDs. In the Select function, the virtual objects in the parameter List<BattleActor> need to be temporarily stored. Then BaseSelector in "selectors" is used to invoke the Select function with the temporarily stored List<BattleActor> as a parameter to determine whether a BattleActor is returned. If a BattleActor is returned, it means that there is already a BattleActor that meets a target condition, e.g., there is a BattleActor that is within a target search range or that can be hit by the skills, and there is no need to traverse the subsequent "selectors". If no BattleActor is returned, the above process is repeated by using BaseSelector in the next "selectors".

PrioritySelector: This selector can sort the filtered List<BattleActor>, and select an appropriate BattleActor. A hit condition, e.g., health point first, distance first, health bar first, distance priority, FocusPoint distance first, etc., may be configured in the table by technical personnel. The user of the terminal selects the hit condition. In the Select function, the parameter List<BattleActor> is sorted according to the configured hit condition, and the first one in the list is returned. NULL is returned if the list is empty.

By configuring search logic of different complexities for different virtual objects and different skills based on the search tree, the user of the terminal can quickly and accurately select the expected virtual object with low operational costs, thereby improving the efficiency of human-machine interaction. Especially for some skills with special mechanisms, such as skills that can be used again after defeating the virtual objects of the enemy camp, the method provided by the embodiments of this application can greatly improve the success rate of skill reuse and improve the efficiency of human-machine interaction, thereby providing a good user experience and improving the playability of the game.

303. The terminal displays the target virtual object within the skill search range, the target virtual object being obtained by searching based on the target position.

The terminal searches within the skill search range to obtain the target virtual object. The terminal searches for a virtual object within the skill search range, and determines a virtual object found as the target virtual object.

In an embodiment of this application, after determining the target virtual object based on the target position, the terminal can display the target virtual object. In some embodiments, if the user is not satisfied with the target virtual object, the user can further change the target virtual object by dragging the triggering option corresponding to the second skill. Changing the target virtual object is equivalent to searching for a virtual object again. For the process of searching for a virtual object, reference may be made to the search tree mechanism in step 302 above, and the details will not be repeated here.

In some embodiments, before determining the target virtual object, the terminal has already displayed the target virtual object. In this case, after obtaining the target virtual object by searching within the skill search range, the terminal marks up the target virtual object in the skill search range.

304. The terminal controls the first virtual object to cast the second skill to the target virtual object in accordance with a determination that the first virtual object reaches the target position.

In an embodiment of this application, in a cast that the first virtual object successfully reaches the target position, the terminal controls the first virtual object to cast the second skill to the target virtual object.

Figure 6:
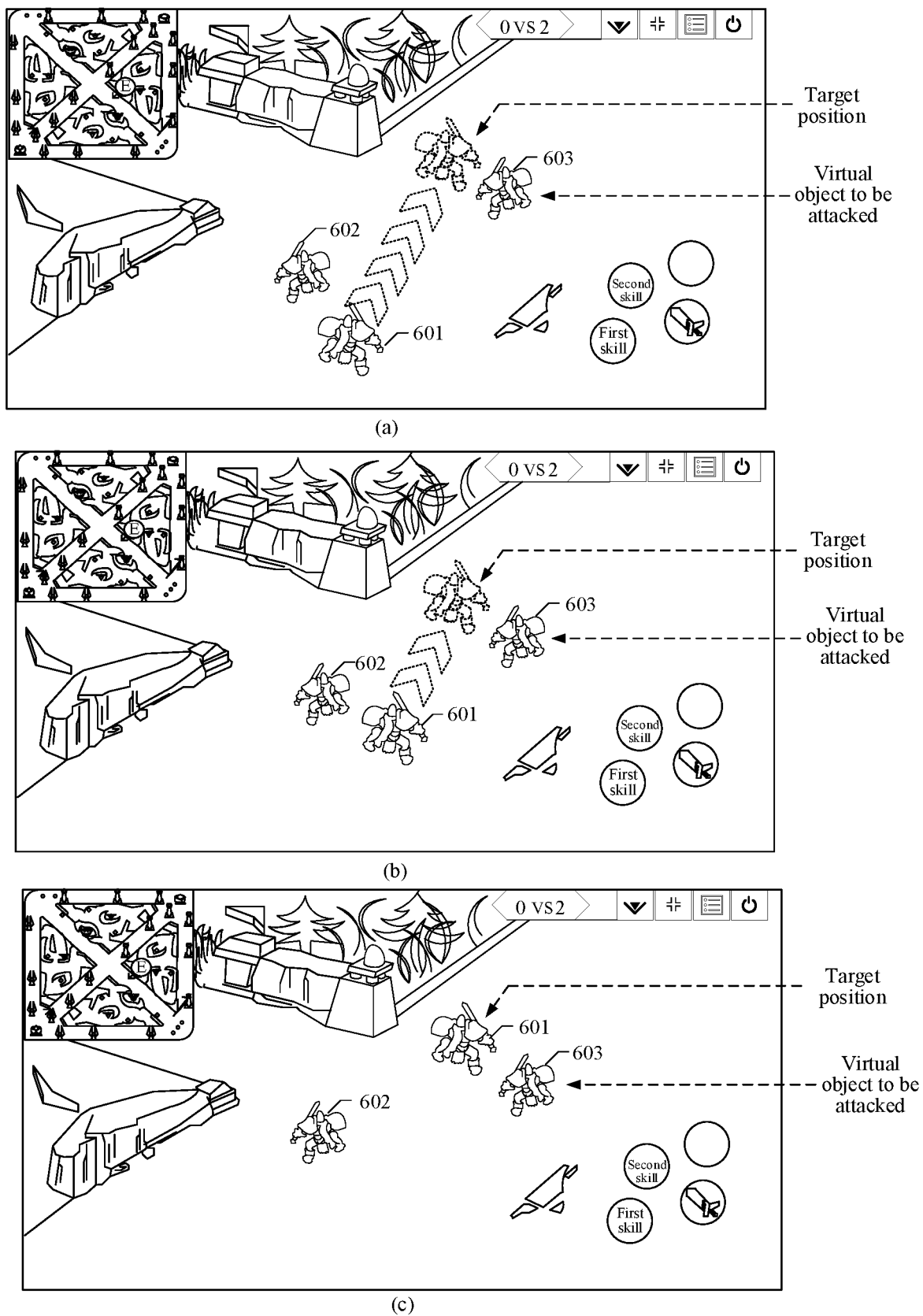
FIG. 6 is a schematic diagram of a virtual object control method according to an embodiment of this application.

To make the virtual object control method described in the foregoing steps 301 to 304 more comprehensible, refer to FIG. 6, which is a schematic diagram of a virtual object control method according to an embodiment of this application. As shown in FIG. 6, a virtual scene includes a first virtual object 601, a third virtual object 602, and a fourth virtual object 603, and a position at which a virtual object denoted by dashed lines is located represents a position to which the first virtual object 601 is to move. Section (a) in FIG. 6 shows an interface before movement of the first virtual object 601, section (b) in FIG. 6 shows an interface during movement of the first virtual object 601, and section (c) in FIG. 6 shows an interface after movement of the first virtual object 601. If the user triggers the second skill during movement of the first virtual object 601 from the position of the first virtual object 601 in section (a) in FIG. 6 to the position of the first virtual object 601 in section (c) in FIG. 6 (that is, the target position), in the related art, the terminal search for a target virtual object based on the current position of the first virtual object 601, that is, search for a virtual object to be attacked based on the position corresponding to the first virtual object 601. At this moment, the third virtual object 602 is closest to the first virtual object 601, so the terminal determines the third virtual object 602 as the virtual object to be attacked. After the movement of the first virtual object 601 ends, the terminal controls the first virtual object 601 to attack the third virtual object 602. Such a method in the related art requires the first virtual object 601 to approach the third virtual object 602 in order to attack the third virtual object 602. However, in the solution provided by the embodiments of this application, the terminal searches by taking the target position where the first virtual object 601 is located after moving as the center, and determines the fourth virtual object 603 that is closer to the target position as the virtual object to be attacked. As such, the first virtual object 601 will be attacked. The first virtual object 601 can directly attack the fourth virtual object 603 once the movement of the first virtual object 601 ends.

The foregoing steps 301 to 304 are an optional implementation of the virtual object control method according to the embodiments of this applications. Correspondingly, the terminal may also implement the virtual object control method in other manners.

Figure 7:
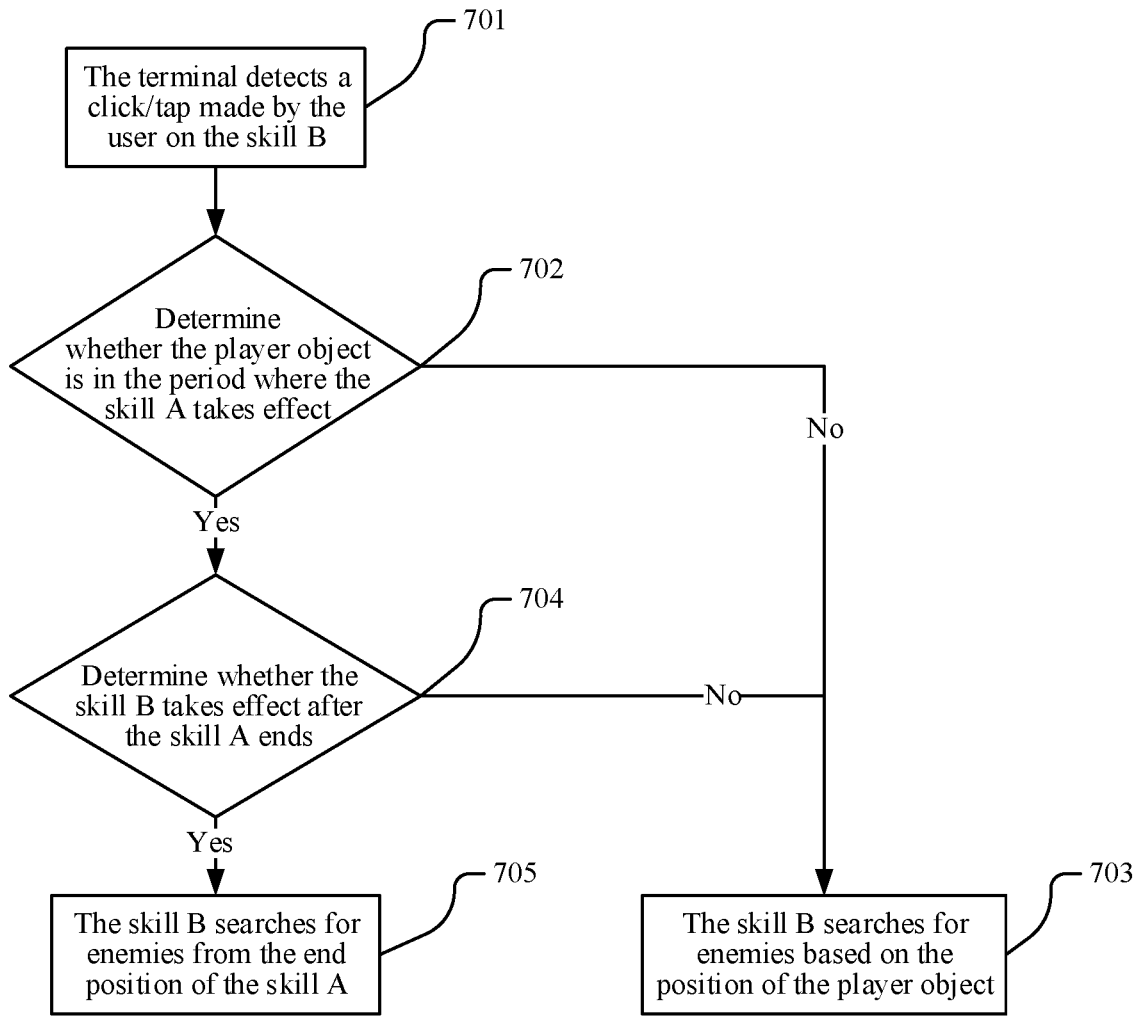
FIG. 7 is a flowchart of enemy searching according to an embodiment of this application.

For example, for the process of searching for a target virtual object in the virtual object control method, refer to FIG. 7, which is a flowchart of enemy searching according to an embodiment of this application. As shown in FIG. 7, searching for a target virtual object is briefly referred to as enemy searching, the first virtual object is a player object, the first skill is a skill A, the second skill is a skill B, and the skill B takes effect after the skill A ends. The process includes the following steps: 701. The terminal detects a click/tap made by the user on the skill B. 702. Determine whether the player object is in the period where the skill A takes effect. If no, go to 703; if yes, go to 704. 703. The skill B searches for enemies based on the position of the player object. 704. Determine whether the skill B takes effect after the skill A ends. If no, go to 703; if yes, go to 705. 705. The skill B searches for enemies from the end position of the skill A.

In the solution provided by the embodiments of this application, by searching based on the target indicated by the first skill in response to the triggering operation on the second skill during a period where the first skill takes effect, the target virtual object can be found; then, when the first virtual object stops moving and reaches the target position, the first virtual object is controlled to cast the second skill to the target virtual object, so that a virtual object actually attacked is consistent with a virtual object expected to be attacked by the user, thereby significantly improving the efficiency of human-machine interaction.

Figure 8:
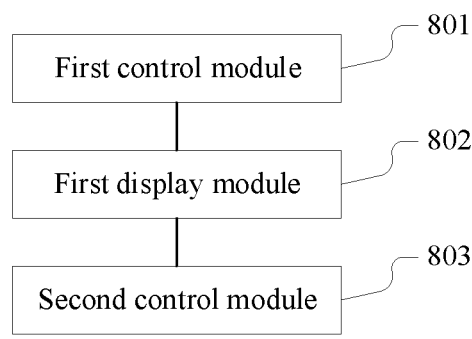
FIG. 8 is a block diagram of a virtual object control apparatus according to an embodiment of this application.

FIG. 8 is a block diagram of a virtual object control apparatus according to an embodiment of this application. The apparatus is configured to execute the steps in the above-mentioned virtual object control method. Referring to FIG. 8, the apparatus includes: a first control module 801, a first display module 802, and a second control module 803.

The first control module 801 is configured to control a first virtual object to move toward a target position in response to a triggering operation on a first skill, the first skill being used for changing a position of the first virtual object.

The first display module 802 is configured to search based on the target position to obtain a target virtual object, in response to a triggering operation on the second skill during a period where the first skill takes effect.

The second control module 803 is configured to control the first virtual object to cast the second skill to the target virtual object in accordance with a determination that the first virtual object reaches the target position.

In some embodiments, the first display module 801 is configured to mark up the target virtual object found.

In some embodiments, the first display module 801 is configured to determine the target position on a movement path corresponding to the first skill in response to the triggering operation on the first skill; and control the first virtual object to move toward the target position.

In some embodiments, the first display module 801 is configured to correct an end position of the movement path to obtain the target position in accordance with a determination that there is an obstacle in the movement path, in response to the triggering operation on the first skill.

In some embodiments, the first display module 801 is configured to display the movement path in response to the triggering operation on the first skill.

In some embodiments, the first display module 801 is configured to determine the target position in accordance with a determination that an end position corresponding to the first skill is a position unreachable for virtual objects, in response to the triggering operation on the first skill, the target position being a position reachable for virtual objects; and control the first virtual object to move toward the target position.

In some embodiments, the first display module 801 is configured to correct the end position to obtain the target position in accordance with a determination that the end position is a position unreachable for virtual objects.

In some embodiments, the first display module 801 is configured to display the end position in response to the triggering operation on the first skill.

In some embodiments, the first display module 801 is configured to determine a skill search range corresponding to the second skill by using the target position as a search center, in response to the triggering operation on the second skill during the period where the first skill takes effect; and search within the skill search range to obtain the target virtual object.

In some embodiments, the first display module 801 is configured to display the skill search range.

Figure 9:
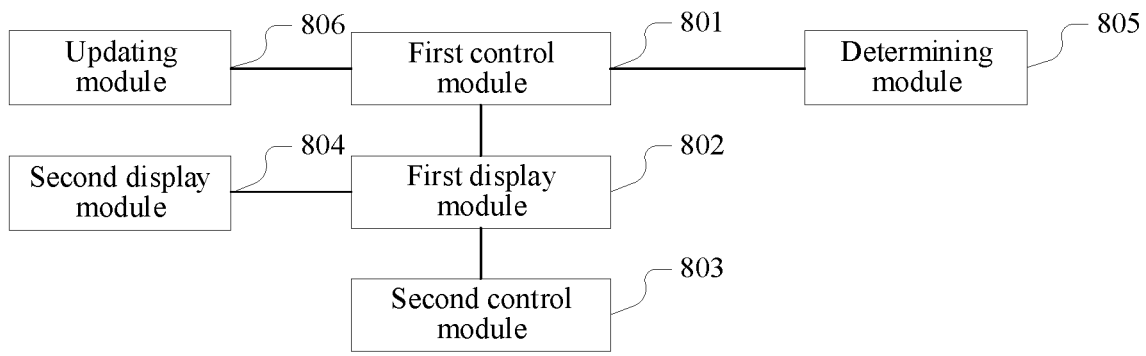
FIG. 9 is a block diagram of another virtual object control apparatus according to an embodiment of this application.

In some embodiments, referring to FIG. 9, FIG. 9 is a block diagram of another virtual object control apparatus according to an embodiment of this application. The apparatus further includes:

a second display module 804, configured to display a skill indication mark of the second skill in response to the triggering operation on the second skill during the period where the first skill takes effect, the skill indication mark pointing from the target position to a position of the target virtual object.

In some embodiments, the second display module 804 is configured to generate a substitute object corresponding to the first virtual object at the target position, the substitute object being an invisible object; determine an orientation of the substitute object based on the position of the target virtual object; and display the skill indication mark of the second skill based on the orientation of the substitute object.

In some embodiments, referring to FIG. 9, the apparatus further includes:

a determining module 805, configured to update the target position to a current position of the first virtual object in accordance with a determination that a movement process of the first virtual object is interrupted.

In some embodiments, referring to FIG. 9, the apparatus further includes:

an updating module 806, configured to update the target position in real time according to a position of the second virtual object, in accordance with a determination that the first skill is used for moving the first virtual object to the position of the second virtual object.

In the solution provided by the embodiments of this application, by searching based on the target indicated by the first skill in response to the triggering operation on the second skill during a period where the first skill takes effect, the target virtual object can be found; then, when the first virtual object stops moving and reaches the target position, the first virtual object is controlled to cast the second skill to the target virtual object, so that a virtual object actually attacked is consistent with a virtual object expected to be attacked by the user, thereby significantly improving the efficiency of human-machine interaction.

When the virtual object control apparatus provided in the foregoing embodiment controls the virtual object, only division of the foregoing function modules is used as an example for description. In the practical application, the functions may be allocated to and completed by different function modules according to requirements. That is, an internal structure of the apparatus is divided into different function modules, to complete all or some of the functions described above. In addition, the virtual object control apparatus and the virtual object control method provided in the foregoing embodiments belong to the same concept. For a specific implementation process, refer to the method embodiment, and details are not described herein again.

Figure 10:
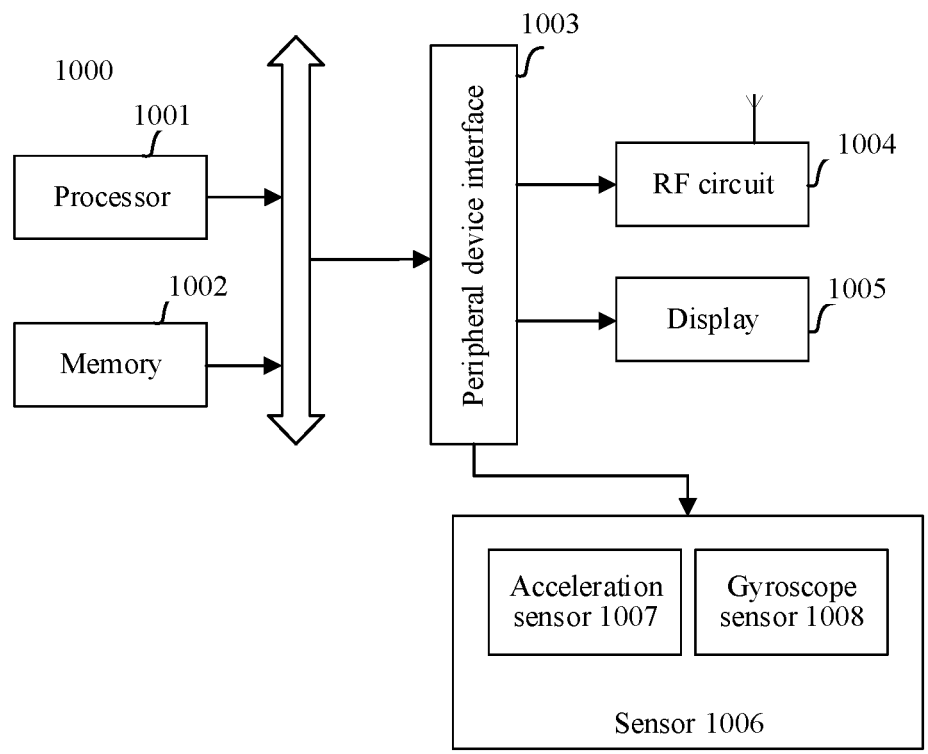
FIG. 10 is a structural block diagram of a terminal according to an embodiment of this application.

FIG. 10 is a structural block diagram of a terminal according to an embodiment of this application. The terminal 1000 may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 1000 may also be referred to as user equipment, a portable terminal, a laptop terminal, or a desktop terminal, among other names.

Generally, the terminal 1000 includes a processor 1001 and a memory 1002.

The processor 1001 may include one or more processing cores, for example, a 4-core processor or an 8-core processor. The processor 1001 may be implemented in at least one hardware form of digital signal processor (DSP), a field-programmable gate array (FPGA), and a programmable logic array (PLA). The processor 1001 may alternatively include a main processor and a coprocessor. The main processor is configured to process data in an active state, also referred to as a central processing unit (CPU). The coprocessor is a low-power processor configured to process data in a standby state. In some embodiments, the processor 1001 may be integrated with a graphics processing unit (GPU). The GPU is configured to render and draw content that needs to be displayed on a display. In some embodiments, the processor 1001 may further include an artificial intelligence (AI) processor. The AI processor is configured to process a computing operation related to machine learning.

The memory 1002 may include one or more computer-readable storage media. The computer-readable storage medium may be non-transient. The memory 1002 may further include a high-speed random access memory (RAM) and a nonvolatile memory, for example, one or more disk storage devices or flash storage devices. In some embodiments, a non-transitory computer-readable storage medium in the memory 1002 is configured to store at least one computer program, the at least one computer program being configured to be executed by the processor 1001 to implement the virtual object control method provided in the method embodiments of this application.

In some embodiments, the terminal 1000 may in some embodiments include a peripheral interface 1003 and at least one peripheral. The processor 1001, the memory 1002, and the peripheral interface 1003 may be connected by a bus or a signal line. Each peripheral may be connected to the peripheral interface 1003 by using a bus, a signal cable, or a circuit board. In some embodiments, the peripheral device includes: at least one of a radio frequency circuit 1004 and a display 1005.

The peripheral device interface 1003 may be configured to connect at least one peripheral related to input/output (I/O) to the processor 1001 and the memory 1002. In some embodiments, the processor 1001, the memory 1002, and the peripheral interface 1003 are integrated on the same chip or the same circuit board. In some other embodiments, any or both of the processor 1001, the memory 1002, and the peripheral interface 1003 may be implemented on an independent chip or circuit board, which is not limited in this embodiment.

The RF circuit 1004 is configured to receive and transmit an RF signal, also referred to as an electromagnetic signal. The RF circuit 1004 communicates with a communication network and another communications device by using the electromagnetic signal. The RF circuit 1004 converts an electric signal into an electromagnetic signal for transmission, or converts a received electromagnetic signal into an electric signal. In some embodiments, the RF circuit 1004 includes: an antenna system, an RF transceiver, one or more amplifiers, a tuner, an oscillator, a digital signal processor, a codec chip set, a subscriber identity module card, and the like. The RF circuit 1004 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF circuit 1004 may further include a circuit related to NFC, which is not limited in this application.

The display screen 1005 is configured to display a user interface (UI). The UI may include a graph, a text, an icon, a video, and any combination thereof. When the display screen 1005 is a touch display screen, the display screen 1005 is further capable of acquiring touch signals on or above a surface of the display screen 1005. The touch signal may be used as a control signal to be inputted to the processor 1001 for processing. In this case, the display screen 1005 may be further configured to provide a virtual button and/or a virtual keyboard that are/is also referred to as a soft button and/or a soft keyboard. In some embodiments, there may be one display screen 1005, disposed on a front panel of the terminal 1000. In other embodiments, there may be at least two display screens 1005 that are respectively disposed on different surfaces of the terminal 1000 or folded. In some other embodiments, the display screen 1005 may be a flexible display screen disposed on a curved surface or a folded surface of the terminal 1000. Even, the display screen 1005 may be further set in a non-rectangular irregular pattern, namely, a special-shaped screen. The display screen 1005 may be prepared by using materials such as a liquid crystal display (LCD), an organic light-emitting diode (OLED), or the like.

In some embodiments, the terminal 1000 may also include one or more sensors 1006. The one or more sensors 1006 include, but are not limited to: an acceleration sensor 1007, and a gyroscope sensor 1008.

The acceleration sensor 1007 may detect the magnitude of acceleration on three coordinate axes of a coordinate system established by the terminal 1000. For example, the acceleration sensor 1007 may be configured to detect components of gravity acceleration on the three coordinate axes. The processor 1001 may control, according to a gravity acceleration signal collected by the acceleration sensor 1007, the display screen 1005 to display the user interface in a frame view or a portrait view. The acceleration sensor 1007 may be further configured to acquire motion data of a game or a user.

The gyroscope sensor 1008 may detect a body direction and a rotation angle of the terminal 1000, and may collect a 3D action of the user on the terminal 1000 together with the acceleration sensor 1007. The processor 1001 may implement the following functions according to data acquired by the gyroscope sensor 1008: motion sensing (for example, the UI is changed according to a tilt operation of a user), image stabilization during shooting, game control, and inertial navigation.

A person skilled in the art may understand that the structure shown in FIG. 10 does not constitute a limitation to the terminal 1000, and the terminal may include more components or fewer components than those shown in the figure, or some components may be combined, or a different component deployment may be used According to another aspect, the embodiments of this application further provide a computer device, including a processor and a memory, the memory storing at least one computer program, and the at least one computer program being loaded and executed by the processor to implement the following operations:

controlling a first virtual object to move toward a target position in response to a triggering operation on a first skill, the first skill being used for changing a position of the first virtual object; searching based on the target position to obtain a target virtual object, in response to a triggering operation on the second skill during a period where the first skill takes effect; and controlling the first virtual object to cast the second skill to the target virtual object in accordance with a determination that the first virtual object reaches the target position.

In some embodiments, the at least one computer program is loaded and executed by the processor to implement the following operation: marking up the target virtual object found.

In some embodiments, the at least one computer program is loaded and executed by the processor to implement the following operations: determining the target position on a movement path corresponding to the first skill in response to the triggering operation on the first skill; and controlling the first virtual object to move toward the target position.

In some embodiments, the at least one computer program is loaded and executed by the processor to implement the following operation: correcting an end position of the movement path to obtain the target position in accordance with a determination that there is an obstacle in the movement path, in response to the triggering operation on the first skill.

In some embodiments, the at least one computer program is loaded and executed by the processor to implement the following operation: displaying the movement path in response to the triggering operation on the first skill.

In some embodiments, the at least one computer program is loaded and executed by the processor to implement the following operations: determining the target position in accordance with a determination that an end position corresponding to the first skill is a position unreachable for virtual objects, in response to the triggering operation on the first skill, the target position being a position reachable for virtual objects; and controlling the first virtual object to move toward the target position.

In some embodiments, the at least one computer program is loaded and executed by the processor to implement the following operation: correcting the end position to obtain the target position in accordance with a determination that the end position is a position unreachable for virtual objects.

In some embodiments, the at least one computer program is loaded and executed by the processor to implement the following operation: displaying the end position in response to the triggering operation on the first skill.

In some embodiments, the at least one computer program is loaded and executed by the processor to implement the following operations: determining a skill search range corresponding to the second skill by using the target position as a search center, in response to the triggering operation on the second skill during the period where the first skill takes effect; and searching within the skill search range to obtain the target virtual object.

In some embodiments, the at least one computer program is loaded and executed by the processor to implement the following operation: displaying the skill search range.

In some embodiments, the at least one computer program is loaded and executed by the processor to implement the following operation: displaying a skill indication mark of the second skill in response to the triggering operation on the second skill during the period where the first skill takes effect, the skill indication mark pointing from the target position to a position of the target virtual object.

In some embodiments, the at least one computer program is loaded and executed by the processor to implement the following operations: generating a substitute object corresponding to the first virtual object at the target position, the substitute object being an invisible object; determining an orientation of the substitute object based on the position of the target virtual object; and displaying the skill indication mark of the second skill based on the orientation of the substitute object.

In some embodiments, the at least one computer program is loaded and executed by the processor to implement the following operation: updating the target position to a current position of the first virtual object in accordance with a determination that a movement process of the first virtual object is interrupted.

In some embodiments, the at least one computer program is loaded and executed by the processor to implement the following operation: updating the target position in real time according to a position of the second virtual object, in accordance with a determination that the first skill is used for moving the first virtual object to the position of the second virtual object.

The embodiments of this application further provide a computer-readable storage medium. For example, the computer-readable storage medium may be a read-only memory (ROM), a random access memory (RAM), a compact disc read-only memory (CD-ROM), a magnetic tape, a floppy disk, an optical data storage device, etc. The computer-readable storage medium stores at least one computer program, the at least one computer program being loaded and executed by a processor to implement the following operations:

controlling a first virtual object to move toward a target position in response to a triggering operation on a first skill, the first skill being used for changing a position of the first virtual object; searching based on the target position to obtain a target virtual object, in response to a triggering operation on the second skill during a period where the first skill takes effect; and controlling the first virtual object to cast the second skill to the target virtual object in accordance with a determination that the first virtual object reaches the target position.

In some embodiments, the at least one computer program is loaded and executed by the processor to implement the following operation: marking up the target virtual object found.

In some embodiments, the at least one computer program is loaded and executed by the processor to implement the following operations: determining the target position on a movement path corresponding to the first skill in response to the triggering operation on the first skill; and controlling the first virtual object to move toward the target position.

In some embodiments, the at least one computer program is loaded and executed by the processor to implement the following operation: correcting an end position of the movement path to obtain the target position in accordance with a determination that there is an obstacle in the movement path, in response to the triggering operation on the first skill.

In some embodiments, the at least one computer program is loaded and executed by the processor to implement the following operation: displaying the movement path in response to the triggering operation on the first skill.

In some embodiments, the at least one computer program is loaded and executed by the processor to implement the following operations: determining the target position in accordance with a determination that an end position corresponding to the first skill is a position unreachable for virtual objects, in response to the triggering operation on the first skill, the target position being a position reachable for virtual objects; and controlling the first virtual object to move toward the target position.

In some embodiments, the at least one computer program is loaded and executed by the processor to implement the following operation: correcting the end position to obtain the target position in accordance with a determination that the end position is a position unreachable for virtual objects.

In some embodiments, the at least one computer program is loaded and executed by the processor to implement the following operation: displaying the end position in response to the triggering operation on the first skill.

In some embodiments, the at least one computer program is loaded and executed by the processor to implement the following operations: determining a skill search range corresponding to the second skill by using the target position as a search center, in response to the triggering operation on the second skill during the period where the first skill takes effect; and searching within the skill search range to obtain the target virtual object.

In some embodiments, the at least one computer program is loaded and executed by the processor to implement the following operation: displaying the skill search range.

In some embodiments, the at least one computer program is loaded and executed by the processor to implement the following operation: displaying a skill indication mark of the second skill in response to the triggering operation on the second skill during the period where the first skill takes effect, the skill indication mark pointing from the target position to a position of the target virtual object.

In some embodiments, the at least one computer program is loaded and executed by the processor to implement the following operations: generating a substitute object corresponding to the first virtual object at the target position, the substitute object being an invisible object; determining an orientation of the substitute object based on the position of the target virtual object; and displaying the skill indication mark of the second skill based on the orientation of the substitute object.

In some embodiments, the at least one computer program is loaded and executed by the processor to implement the following operation: updating the target position to a current position of the first virtual object in accordance with a determination that a movement process of the first virtual object is interrupted.

In some embodiments, the at least one computer program is loaded and executed by the processor to implement the following operation: updating the target position in real time according to a position of the second virtual object, in accordance with a determination that the first skill is used for moving the first virtual object to the position of the second virtual object.

An embodiment of this application further provides a computer program product. The computer program product stores computer program code, the computer program code being stored in a computer-readable storage medium. A processor of a computer device reads the computer program code from the computer-readable storage medium, and executes the computer program code, so that the computer device performs the virtual object control method provided in the various optional implementations.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs a virtual object control method. In practical application, the foregoing functions may be allocated to and completed by different functional modules according to requirements, that is, an inner structure of a device is divided into different functional modules to implement all or a part of the functions described above.

What is claimed is:

1. A virtual object control method, performed on an electronic device, the method comprising:
   controlling a first virtual object to move toward a target position in a virtual environment in response to detecting a triggering operation on a first skill used for changing a position of the first virtual object;

while the first skill is in effect,
  detecting a triggering operation on a second skill;
  in response to detecting the triggering operation on the second skill during a period where the first skill takes effect:
    determining a skill search range corresponding to the second skill in the virtual environment using the target position as a search center; and
    searching within the skill search range to obtain the target virtual object; and
  in accordance with a determination that the first virtual object reaches the target position:
    controlling the first virtual object to cast the second skill on the target virtual object in the virtual environment and
    displaying a skill indication mark of the second skill in the virtual environment, wherein the skill indication mark points from the target position to a position of the target virtual object.

2. The method according to claim 1, further comprising: marking the target virtual object obtained from the searching.

3. The method according to claim 1, wherein controlling the first virtual object to move toward the target position in response to a triggering operation on a first skill comprises:
  in response to the triggering operation on the first skill:
    determining the target position along a movement path corresponding to the first skill; and
    controlling the first virtual object to move toward the target position.

4. The method according to claim 3, wherein determining the target position on the movement path corresponding to the first skill comprises:
  in response to detecting the triggering operation on the first skill, and in accordance with a determination that there is an obstacle in the movement path:
    correcting an end position of the movement path to obtain the target position.

5. The method according to claim 3, further comprising:
  in response to detecting the triggering operation on the first skill:
    displaying the movement path.

6. The method according to claim 1, wherein controlling the first virtual object to move toward the target position in response to detecting the triggering operation on a first skill includes:
  in accordance with a determination that an end position corresponding to the first skill is a position unreachable for virtual objects, and in response to detecting the triggering operation on the first skill:
    setting, as the target position, a position that is reachable by virtual objects; and
    controlling the first virtual object to move toward the target position.

7. The method according to claim 6, further comprising:
  in accordance with the determination that the end position is a position unreachable for virtual objects:
  correcting the end position to obtain the target position.

8. The method according to claim 6, further comprising: displaying the end position in response to detecting the triggering operation on the first skill.

9. The method according to claim 1, further comprising: displaying the skill search range in the virtual environment.

10. The method according to claim 1, wherein displaying a skill indication mark of the second skill in the virtual environment comprises:
  generating a substitute object corresponding to the first virtual object at the target position, wherein the substitute object is an invisible object;
  determining an orientation of the substitute object based on the position of the target virtual object; and
  displaying the skill indication mark of the second skill in the virtual environment based on the orientation of the substitute object.

11. The method according to claim 1, further comprising:
  in accordance with a determination that a movement process of the first virtual object is interrupted at a current position of the first virtual object:
    updating the target position to the current position of the first virtual object.

12. The method according to claim 1, further comprising:
  in accordance with a determination that the first skill moves the first virtual object to a position of the second virtual object:
  updating the target position in real time according to the position of the second virtual object.

13. An electronic device, comprising:
  one or more processors; and
  memory storing one or more programs, the one or more programs comprising instructions that, when executed by the one or more processors, cause the one or more processors to perform operations including:
  controlling a first virtual object to move toward a target position in a virtual environment in response to detecting a triggering operation on a first skill used for changing a position of the first virtual object;
  while the first skill is in effect,
    detecting a triggering operation on a second skill;
    in response to detecting the triggering operation on the second skill during a period where the first skill takes effect:
      determining a skill search range corresponding to the second skill in the virtual environment using the target position as a search center; and
      searching within the skill search range to obtain the target virtual object; and
    in accordance with a determination that the first virtual object reaches the target position:
      controlling the first virtual object to cast the second skill on the target virtual object in the virtual environment and
      displaying a skill indication mark of the second skill in the virtual environment, wherein the skill indication mark points from the target position to a position of the target virtual object.

14. The electronic device according to claim 13, wherein controlling the first virtual object to move toward the target position in response to detecting the triggering operation on a first skill includes:
  in accordance with a determination that an end position corresponding to the first skill is a position unreachable for virtual objects, and in response to detecting the triggering operation on the first skill:
    setting, as the target position, a position that is reachable by virtual objects; and
    controlling the first virtual object to move toward the target position.

15. The electronic device according to claim 14, wherein the operations further comprise:

in accordance with the determination that the end position is a position unreachable for virtual objects:
corrrecting the end position to obtain the target position.

16. A non-transitory computer-readable storage medium, storing a computer program, the computer program, when executed by one or more processors of an electronic device, cause the one or more processors to perform operations comprising:
controlling a first virtual object to move toward a target position in a virtual environment in response to detecting a triggering operation on a first skill used for changing a position of the first virtual object;
while the first skill is in effect,
detecting a triggering operation on a second skill;
in response to detecting the triggering operation on the second skill during a period where the first skill takes effect:
determining a skill search range corresponding to the second skill in the virtual environment using the target position as a search center; and
searching within the skill search range to obtain the target virtual object; and
in accordance with a determination that the first virtual object reaches the target position:
controlling the first virtual object to cast the second skill on the target virtual object in the virtual environment and
displaying a skill indication mark of the second skill in the virtual environment, wherein the skill indication mark points from the target position to a position of the target virtual object.

17. The non-transitory computer-readable storage medium according to claim 16, wherein controlling the first virtual object to move toward the target position in response to detecting the triggering operation on a first skill includes:
in accordance with a determination that an end position corresponding to the first skill is a position unreachable for virtual objects, and in response to detecting the triggering operation on the first skill:
setting, as the target position, a position that is reachable by virtual objects; and
controlling the first virtual object to move toward the target position.

18. The non-transitory computer-readable storage medium according to claim 17, wherein the operations further comprise:
in accordance with the determination that the end position is a position unreachable for virtual objects:
correcting the end position to obtain the target position.

19. The non-transitory computer-readable storage medium according to claim 16, wherein displaying a skill indication mark of the second skill in the virtual environment comprises:
generating a substitute object corresponding to the first virtual object at the target position, wherein the substitute object is an invisible object;
determining an orientation of the substitute object based on the position of the target virtual object; and
displaying the skill indication mark of the second skill in the virtual environment based on the orientation of the substitute object.

20. The electronic device according to claim 13, wherein displaying a skill indication mark of the second skill in the virtual environment comprises:
generating a substitute object corresponding to the first virtual object at the target position, wherein the substitute object is an invisible object;
determining an orientation of the substitute object based on the position of the target virtual object; and
displaying the skill indication mark of the second skill in the virtual environment based on the orientation of the substitute object.

* * * * *